United States Patent [19]

Glass

[11] Patent Number: 4,635,818
[45] Date of Patent: Jan. 13, 1987

[54] SPREADER

[75] Inventor: Henry P. Glass, Northfield, Ill.

[73] Assignee: Duraco Products, Inc., Streamwood, Ill.

[21] Appl. No.: 799,827

[22] Filed: Nov. 20, 1985

[51] Int. Cl.⁴ ............................................. A01C 17/00
[52] U.S. Cl. ..................................... 222/41; 222/625; 239/685
[58] Field of Search ...................... 239/683, 685, 689; 222/23, 41, 173, 608, 613–614, 623–625, 310–311, 465 R, 469–471, 478, 482, 559, 561

[56] References Cited

U.S. PATENT DOCUMENTS

| | | | |
|---|---|---|---|
| 2,318,064 | 5/1943 | Delaney | 222/625 |
| 2,678,145 | 5/1954 | Juzwiak et al. | 222/625 X |
| 2,779,507 | 1/1957 | Rader | 222/625 X |
| 2,840,275 | 6/1958 | Liljenberg | 222/625 |
| 3,122,273 | 2/1964 | Atkinson | 222/41 |
| 3,138,117 | 6/1964 | Dorey | 222/561 X |
| 3,152,732 | 10/1964 | Schulman et al. | 222/625 X |
| 3,187,952 | 6/1965 | Santarelli | 222/625 X |
| 3,224,636 | 12/1965 | Atkinson | 222/41 |
| 3,700,143 | 10/1972 | Shaver et al. | 222/148 |
| 4,106,704 | 8/1978 | McRoskey et al. | 239/685 |
| 4,180,184 | 12/1979 | Florer et al. | 222/41 |
| 4,388,026 | 6/1983 | Green | 406/130 |

Primary Examiner—Joseph J. Rolla
Assistant Examiner—Michael S. Huppert
Attorney, Agent, or Firm—John L. Schmitt

[57] ABSTRACT

A spreader particularly adapted for manual operation over a residential lawn includes a one-piece hopper made of corrosion resistant material. Lugged wheels connect with a shaft which is rotatively carried by and extends through a lower part of the hopper. On the shaft inside the hopper is an agitator bar having outward extending projections. The bar projections align with a series of slots in a rear wall of the hopper for a discharge of material in the hopper to the ground below. To regulate this discharge a movable gate is positioned on an outer side of the hopper slots. Gate movement is effected by a control bar carried in a flow control housing of a handle assembly having an extension attached to the hopper. The degree of gate movement, which affects the size of the slot openings, is regulated by a position of a stop operatively connected to a rotatable dial in the flow control housing. During use an operator holds a handle bar of the handle assembly while compressing the control bar until it engages the stop. This control bar action moves the gate to selectively uncover the hopper slots allowing material in the hopper to discharge. Material flow through the hopper slots is enhanced by rotation of the agitator bar and connecting wheels as the wheels roll over the ground below.

8 Claims, 11 Drawing Figures

SPREADER

BACKGROUND OF THE INVENTION

1. FIELD OF INVENTION

This invention relates generally to devices for distributing granular materials and more particularly to hand operated spreaders for applying fertilizer, grass seed and other like materials on residential lawns.

2. Prior Art

Hand operated devices for distributing granular materials on residential lawns are well known and have been in use for many years. Such devices are available in two general categories, a broadcasting type and a drop type.

U.S. Pat. No. 4,106,704 sets forth a typical broadcast spreader wherein a supply of granular fertilizer material may be placed in a plastic hopper. As the spreader is pushed forward, rotation of the spreader wheels is transferred to an upright shaft which in turn rotates an agitator in the hopper and an impeller positioned below a feed opening in the hopper bottom. Agitator rotation enchances a flow of fertilizer through the opening and onto the impeller where the fertilizer is centrifugally broadcast over a wide area of lawn.

Typical drop-type spreaders are disclosed in U.S. Pat. Nos. 2,678,145, 2,840,275, 3,152,732 and 4,180,184, for example. The '145 spreader has a series of spaced feeder openings formed in a bottom of a hopper bin of the spreader. Flow of material through these openings is regulated by a shutter plate having a like set of openings. The plate may be moved to produce opening alignment or misalignment. Movement of the shutter plate is controlled by rotation of a handle bar of the spreader. This bar connects with the shutter plate through a control rod and pivoted bell crank. The amount of handle rotation and thus rod and shutter plate movement is limited by selective positioning of a calibration plate. The calibration plate in turn interacts with a plate lever attached to the handle bar.

The spreader of the '275 reference is similar in many respects to the '145 spreader. One important difference is the incorporation of over-center locking action to maintain the shutter plate in an open or closed position. The spreader of the '732 reference is also similar but has wheels formed with a series of peripheral lugs to improve wheel-ground traction.

The '184 spreader includes an operating lever pivotally attached to a handle of the spreader. During use one hand of the operator squeezes the lever and handle together. This lever movement is transferred to a control wire connected to a bell crank pivotally attached to a hopper of the spreader. Rotation of the bell crank slides a gate to allow fertilizer in the hopper to flow through aligned slots in the hopper and gate respectively to the ground below. When the lever is released, a spring returns the gate to a position where the slots misalign and flow is stopped.

SUMMARY OF THE INVENTION

A spreader of this invention, which is particularly adapted for distributing fertilizers, grass seed and other residential lawn care products, has a one-piece plastic molded hopper. The spreader includes lugged wheels carried on a shaft which connects with an agitator bar in the hopper. Material in the hopper may flow through spaced slots in a rear wall of the hopper. These slots are positioned adjacent to the agitator bar. A gate is positioned on an outer side of the slots to regulate this flow.

The spreader further includes a rotatable kickstand attached to the hopper. The kickstand in its down position may be used to maintain the spreader upright when the spreader is not in use; during spreader use the kickstand may be placed in its up position. Lastly, the spreader has a handle assembly. The handle assembly comprises a tubular extension having a lower end connecting with the hopper and an upper end with a flow control housing. A handle bar extends through the flow control housing. Slidably disposed in the housing is a control bar having end finger gripping recesses. The control bar connects with a hollow control rod which extends downward inside the extension to connect in turn with the gate.

Downward control bar-rod-gate movement, which places the gate in a position to cover the hopper slots, is induced by a coil spring attached to the control bar inside the extension. Upward control bar-rod-gate movement, which places the gate in a position to uncover the slots, is regulated in part by the position of a post that acts as a stop. The post is located in a groove in the flow control housing and in a helically shaped slot in a dial rotatively carried in the housing. The post connects with one end of an L-shaped pin. An opposite end of the pin is slidably disposed inside the control rod.

Before use of the spreader the hopper is filled with a supply of fertilizer, for example. During this filling the kickstand is down to maintain the spreader in an upright position. The rate of fertilizer dispersion may be adjusted by rotation of the flow control housing dial which moves the location of the stop post. With the spreader hopper full and kickstand up the spreader may be moved to a lawn area to be fertilized. The operator then pushes the spreader forward while at the same time manually compressing the control bar until the control bar engages the stop post in the control housing.

Control bar movement is transferred to the gate to uncover the hopper slots and allow a discharge of fertilizer. Note that the position of the stop post affects the degree of gate movement and thus the degree that the gate uncovers the hopper slots. As the spreader is pushed forward, the wheels of the spreader rotate to produce a like rotation of the agitator bar in the hopper. Projections on the bar interact with the fertilizer thereabout to produce a uniform flow through the hopper slots to the ground below. During operation the elevation of the handle bar may be adjusted as the operator desires.

When the operator wishes to stop the discharge of fertilizer, the control bar is merely released. Gravity and the spring attached to the control bar move the gate to cover the hopper slots with a bottom edge of the gate seating against a front wall of the hopper to form a seal therewith. Proper seating of this gate edge is enhanced by a relief space formed below the gate.

The spreader of this invention offers a number of advantages over other like devices.

A first important advantage is that the structure of many of the spreader components allows fabrication of corrosion resistant plastic. For example, the spreader hopper and wheels each may be molded as one piece. While some components are metal, metal-to-metal contact is kept to an absolute minimum. To appreciate the importance of this advantage it must be understood that fertilizer comprises chemically active matter and that a spreader at best is stored in a garage or shed.

Water vapor in the atmosphere readily combines with this chemically active matter in the fertilizer to form highly corrosive reagents that readily attack metal parts. Resulting corrosion quickly renders such parts useless.

A second important advantage is that this spreader has a kickstand which in its down position conveniently holds the spreader upright and then may be placed in its up position during spreader operation. With the kickstand up the elevation of the spreader handle bar may be readily adjusted to a position most comfortable for the operator regardless of changes in the slope of the terrain being worked. Note that during operation the forefingers of the operator compress the control bar to move the gate to uncover the hopper slots and allow a flow of material. Handle bar elevation adjustment reduces operator arm and hand fatique.

Operator fatigue is further reduced by minimizing the amount of force required to effect gate movement and to maintain the gate up and hopper slots uncovered. To minimize this force the control bar-rod-gate assembly is light weight. Additionally, frictional restraint to movement of this assembly is minimized first by utilizing low coefficient of friction, corrosion resistant materials, i.e. plastics. Further, gate movement and control bar movement at all times are aligned. Thus, the compressive force applied by the operator's fingers to the control bar is transferred directly to the gate.

This structural arrangement is also important to gate closing. Action by the spring to close the gate likewise is direct. This action is direct in part because there is no lost motion. All connections therebetween are fixed. Note also the movement of the control bar-rod-gate assembly is not impeded by the means for adjusting the degree of material flow, i.e. control housing dial and stop post. As a result the amount of tension on the spring when the gate is raised to uncover the hopper slots is minimal.

The spring action that returns the gate to a normally closed position to terminate material flow is a still further advantage. To effect this termination the operator merely releases the control bar. Gate configuration promotes a positive cutoff of material flow. The gate covers the hopper slots while the lower edge of the gate seats to form a seal with the hopper. The relief space downstream from the gate lower edge insures that any material so located from the gate edge does not impede gate edge seating. Thus, fertilizer is inhibited from inadvertently leaking from the spreader to cause a fertilizer burn in a lawn.

Lastly, the amount of material discharged over a lawn area may be readily adjusted. The flow control housing dial simply is rotated to change the position of the flow control housing stop post. Dial rotation reliability is enhanced since movement of the stop is independent of the control bar as discussed above. Thus, this adjustment may be made while the spreader is in operation. Being able to adjust the degree to which the slots are uncovered when the spreader is in motion is particularly useful when only a small amount of material remains in the hopper. This remainder fertilizer portion comprises mostly larger size granules which resist discharge unless the size of the slots is increased. Also note that the hopper slots as located are in view of the operator as the spreader is being pushed. Were the rate of flow to change inadvertently, the operator may take immediate corrective action.

DESCRIPTION OF THE PREFERRED EMBODIMENT

Figures 1, 2:
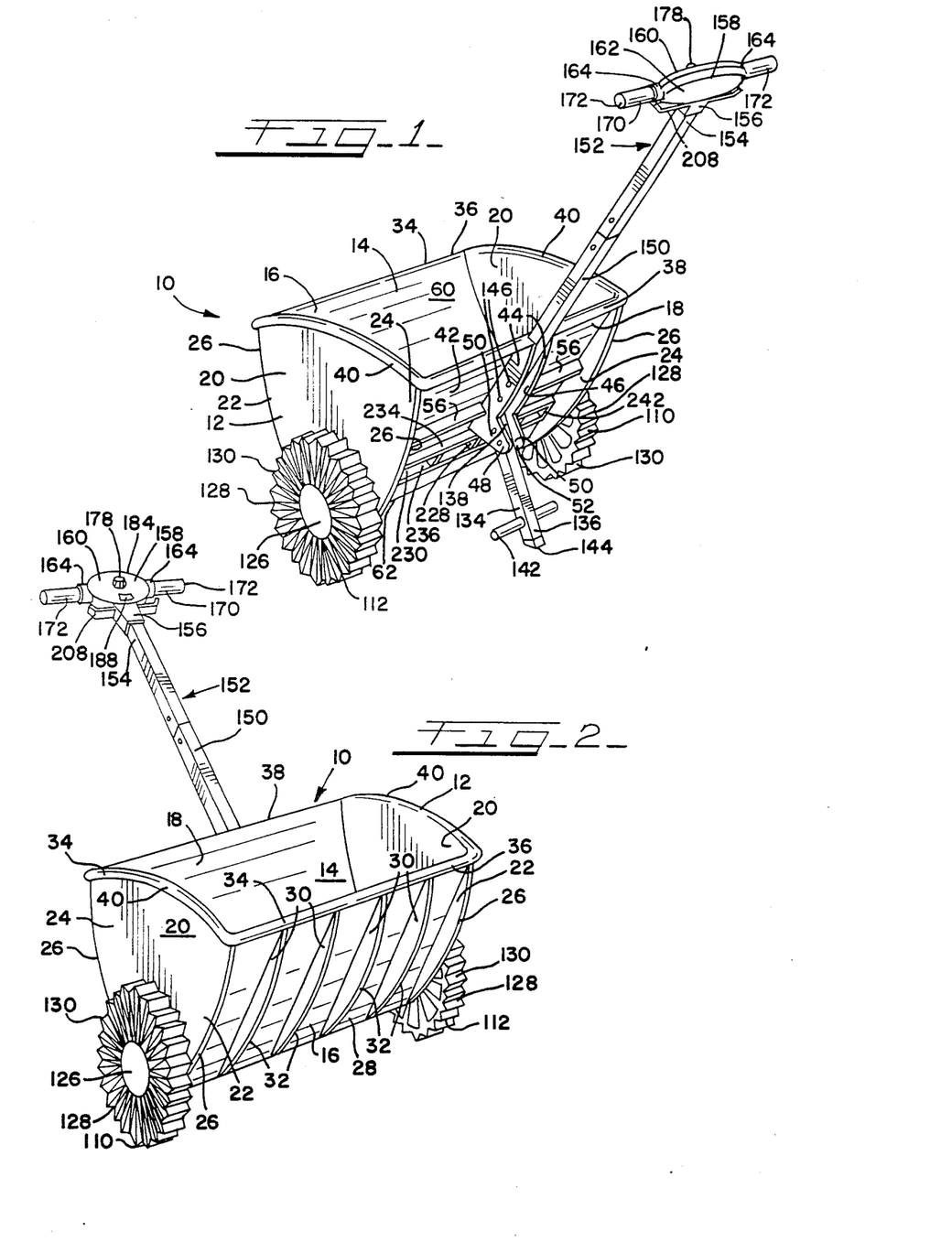
FIG. 1 is a rear perspective view of a spreader of this invention.
FIG. 2 is a front perspective view of the spreader of FIG. 1.

A spreader of this invention which is particularly adapted for hand operation is shown generally in FIGS. 1 and 2 and designated 10. The spreader 10 may be used to dispense on a residential lawn any number of granular products such as grass seed or inorganic fertilizer.

The spreader 10 includes a hopper 12 having an inner space 14 defined by downward converging front and rear walls 16,18 and connecting sidewalls 20. Each sidewall 20 has a front and rear outer portion 22,24 which extend respectively beyond the front and rear wall 16,18. Each sidewall front and rear outer portion 22,24 in turn has an arcuate shaped outer edge 26. Attached to an outer side 28 of the front wall 16 and between the front portions 22 of the sidewalls 20 is a set of equispaced ribs 30. Each rib 30 has a like-arcuate shaped outer edge 32.

The hopper 12 further includes a top reinforcing flange 34 formed by a joinder of front and rear wall flange portions 36,38 with sidewall flange portions 40. All of these flange portions 36–40 slope downward to form an acute angle with the respective hopper walls 16–20. Note that the front wall flange portion 36 is positioned parallel to the rear wall 18 while the rear wall flange portion 38 is positioned in a like manner with respect to the front wall 16.

Attached to an outer side 42 of the hopper rear wall 18 is a pair of spaced apart L-shaped arms 44. On an inner surface 46 of each arm 44 at an outer end 48 of a bracket portion 50 of the arms 44 is a boss 52. These bosses 52 are positioned in an opposing manner to extend into a space between the arm bracket portions 50. Connecting respectively with each arm 44 is a horizontally positioned rib 56. These ribs 56 extend across the rear wall outer side 42 to connect with the sidewall rear outer portions 24 respectively. Note that these ribs 56 also are positioned parallel to the rear wall flange portion 38.

Figure 3:
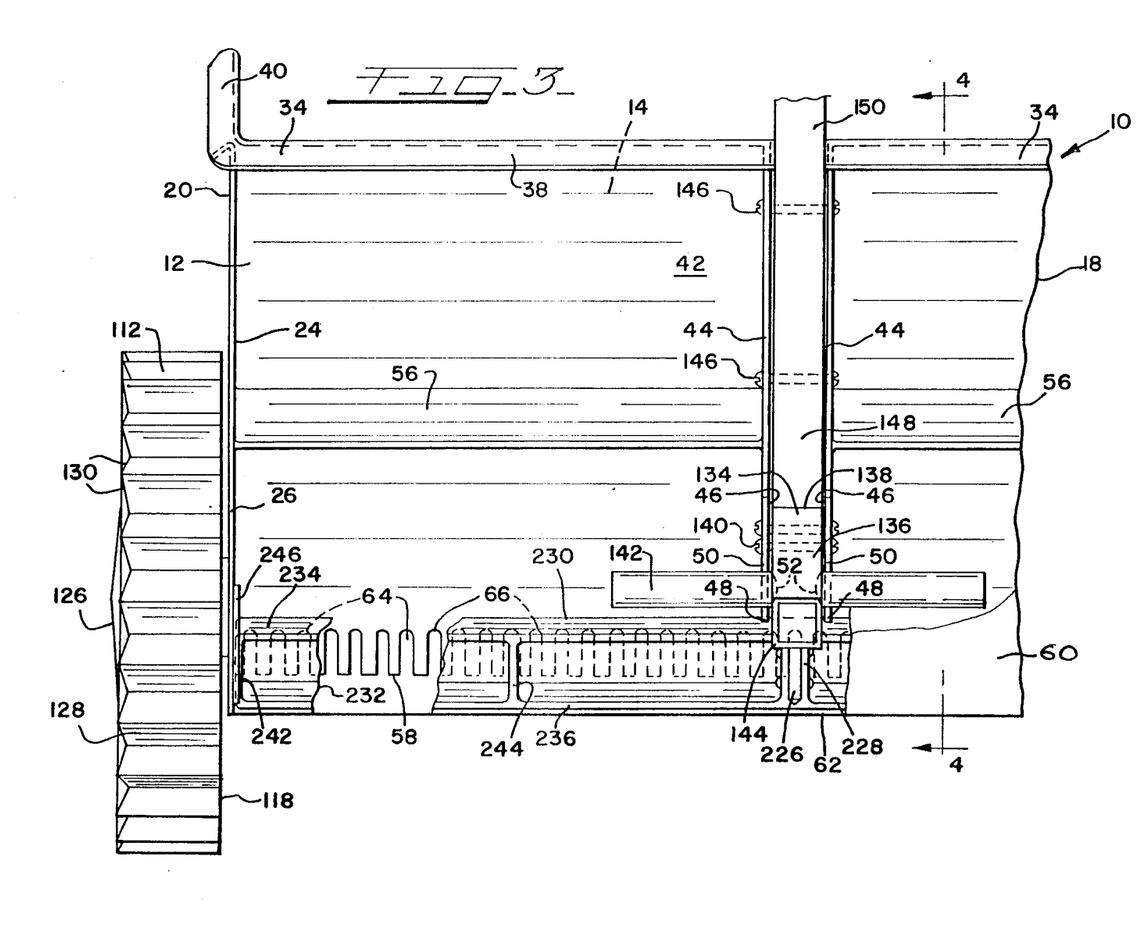
FIG. 3 is an elevation view of a portion of a rear of a hopper of the spreader with part of a gate and rear wall of the spreader cut away.
Figures 4, 5:
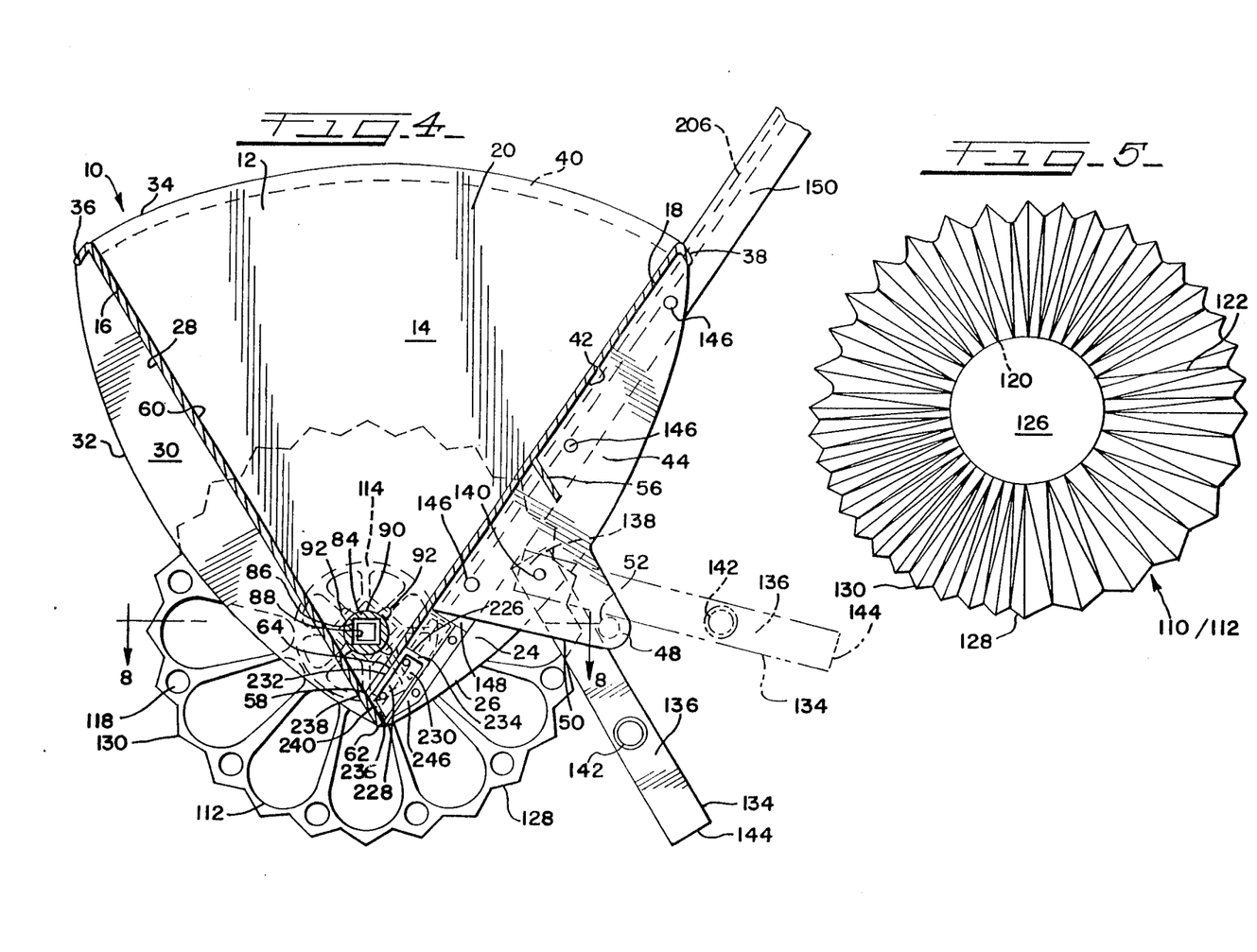
FIG. 4 is a side elevation view in section as seen generally along the line 4—4 in FIG. 3.
FIG. 5 is a detailed side elevation view of a wheel of the spreader.

As best understood by viewing FIGS. 3 and 4, a bottom edge 58 of the hopper rear wall 18 abuts an inner side 60 of the hopper front wall 16 at a point above a bottom edge 62 of the front wall 16. Along this rear wall bottom edge 58 is a series of spaced apart upward extending slots 64. A top radiused end 66 of each slot 64 likewise is positioned in the parallel relationship noted above. Lastly, each hopper sidewall 20 has a circular aperture 68 positioned immediately above the rear wall bottom edge 58.

As described, the hopper 12 may be molded as one piece of a thermoplastic such as a polyolefin; for example, polypropylene. A two-piece die may be used to form the hopper 12. In this case the sidewall apertures 68 may be formed using supplemental core pieces as the hopper 12 is molded or in a subsequent machining operation. Mold surfaces of a male portion of the die form the hopper inner space 14 and defining surfaces; for example, the inner side 60 of the hopper front wall 16. Mold surfaces of a female portion of the die form the defining surfaces of the hopper exterior; for example, the outer sides 28,42 of the hopper front and rear wall 16,18 and the rear wall slots 64. Positioning of the flange portions 36,38, the horizontal ribs 56 and slot radiused ends 66 in the noted parallel relationship allows the die portions to remain aligned as the die portions are drawn apart after the hopper 12 is formed.

Figure 8:
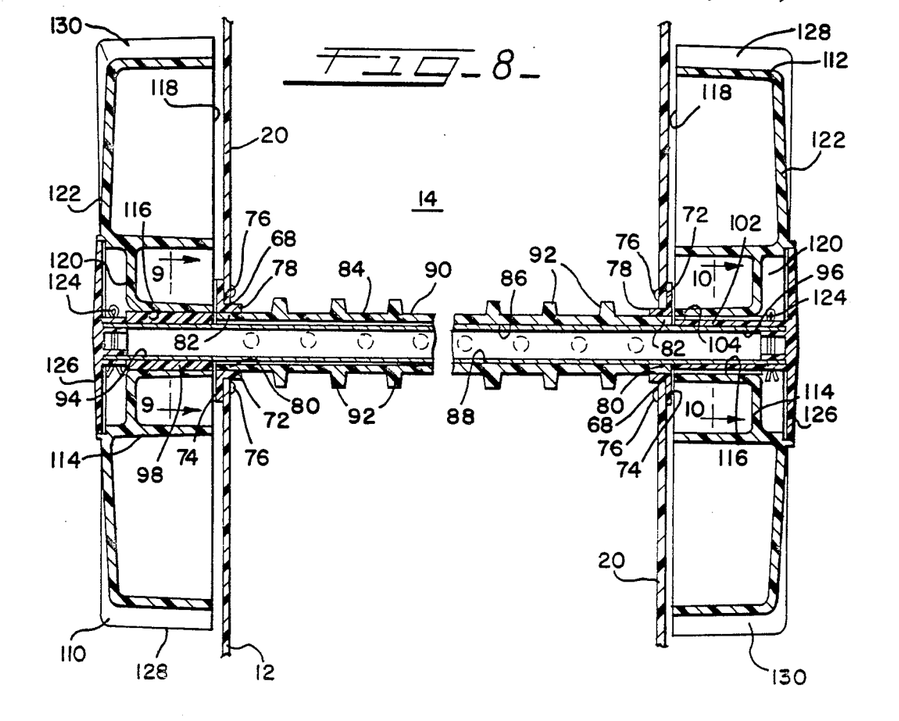
FIG. 8 is a limited view in section of the wheels and an agitator bar of the spreader as carried by sidewall of the spreader.

As seen best in FIG. 8, a bushing 72 is located in each hopper sidewall aperture 68. Peripheral flange portions 74 of the bushings 72 are attached one each to the hopper sidewalls 20 by screws 76 while a collar portion 78 of such is disposed in the apertures 68. In a circular opening 80 which extends through each bushing 72 is a respective end 82 of an agitator bar 84. This bar 84 has a square shaped inner opening 86 for a like shaped tubular shaft 88.

On an outer surface 90 of the agitator bar 84 are four longitudinal rows of spaced apart projections 92. The projection rows are located at 90 degree intervals about the bar outer surface 90. The projections 92 in one row are spaced between the projections 92 in the two adjacent rows. This spacing places one pair of oppositely positioned projections 92 in alignment with each slot 64 in the hopper rear wall 18.

Figure 9:
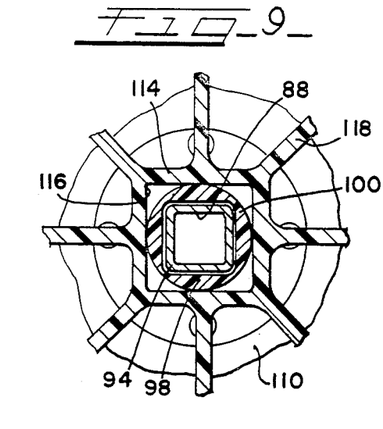
FIGS. 9 and 10 are partial views in section as seen generally along lines 9—9 and 10—10 respectively in FIG. 8.
Figure 10:
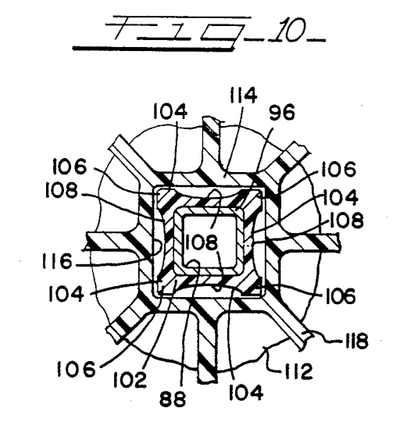

Ends 94,96 of the shaft 88 extend beyond the bushings 72. On the shaft end 94 is a first coupling 98 having a cylindrical outer surface 100 (see FIG. 9). On the other shaft end 96 is a further coupling 102 having a square-like shaped outer surface (see FIG. 10) defined by sides 104. The sides 104 connect to form corner segments 106. Between adjacent corner segments 106 in each coupling side 104 is a shallow, arcuated shaped recess 108.

The spreader 10 still further includes a set of wheels 110,112. Each wheel 110,112 has a centrally located hub 114 with a square-like shaped opening 116 therein. Each opening 116 extends from an inner side 118 of the wheels 110,112 to connect with a circular recess 120 in an outer side 122 of the wheels 110,112.

The shaft ends 94,96 and couplings 96,102 are disposed respectively in these hub openings 116 of the wheels 110,112. As such, the wheel 110 and shaft 88 have a free rotational relationship respectively. On the other hand, the corner segments 106 of the coupling 102 on the shaft end 96 form an interference fit with the hub opening 116 in the wheel 112. This fit is enhanced by the coupling side recesses 108 which allow the corner segments 106 to readily seat within the hub opening 116. Thus, the wheel 112 becomes a drive wheel in that rotational movement of the wheel 112 is transferred to the agitator bar 84 through the coupling 102 and the shaft 88. To maintain the position of the shaft ends 94,96 and coupling 98,102 with respect to the wheel hubs 114, a cotter pin 124 is inserted through each shaft end 94,96. A removable cap 126 may be selectively secured in each wheel recess 120 to protect that shaft end-coupling-wheel hub connection.

As shown in detail in FIG. 5, an outer circumferential surface 128 of each wheel 110,112 is defined by a series of connecting, outward projecting triangular shaped lugs or teeth 130. The wheels 110,112 preferrably have 24 such lugs 130. However, the wheels 110,112 may have 32, 40 or 48 lugs 130 and operate satisfactorily. Regardless of the actual number of lugs 130, each lug 130 ideally projects outward approximately ⅛ in. The importance of the wheel lug configuration is discussed below. Like the hopper 12, the wheels 110,112 may be made as one piece of a molded polyolefin while the couplings 98,102 of a nylon, for example.

A kickstand 134 (see FIGS. 1, 3 and 4) of the spreader 10 includes an upright support 136. An upper end 138 of the support 136 is positioned between the hopper arms 44 where it is pivotally carried on a bolt 140 attached to the arms 44. The kickstand 134 further comprises a cross member 142 joined to the support 136. In FIG. 4 as shown in solid lines, the kickstand 134 is in a "down" position where a bottom end 144 of the upright support 136 may engage, for example, the ground supporting the spreader 10. As positioned, the spreader 10 is held upright with kickstand movement inhibited by interference of the upright support 136 with the bosses 52 on the arm bracket portions 50. The kickstand 134, as shown by broken lines, is in an "up" position. Again, the bosses 52 inhibit downward kickstand movement from this latter position.

Figure 6:
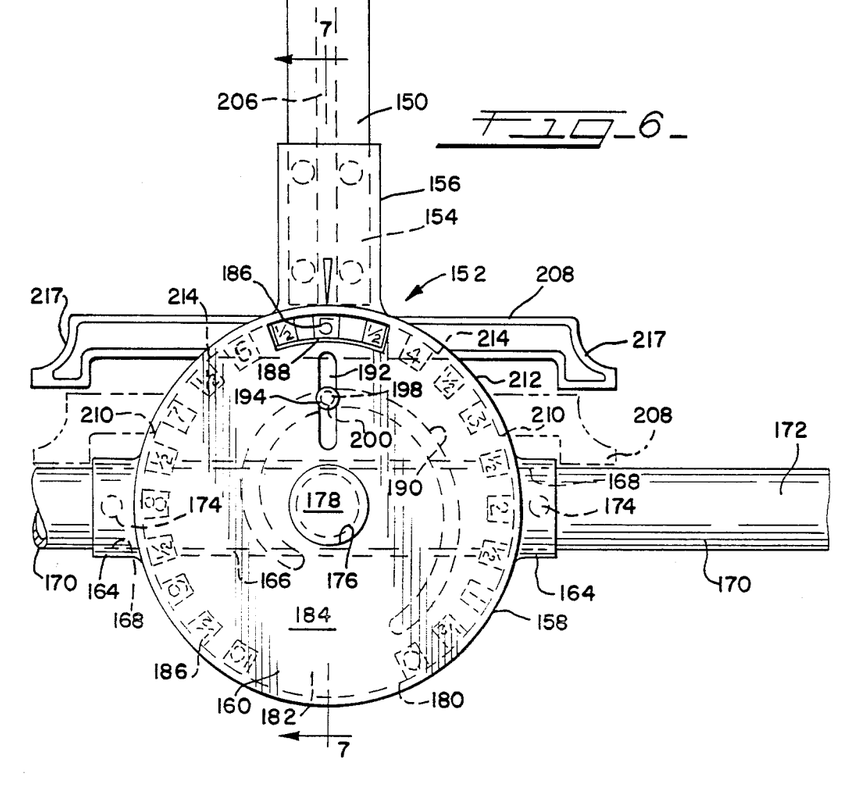
FIG. 6 is a plan view of a flow control housing of a handle assembly of the spreader.
Figure 7:
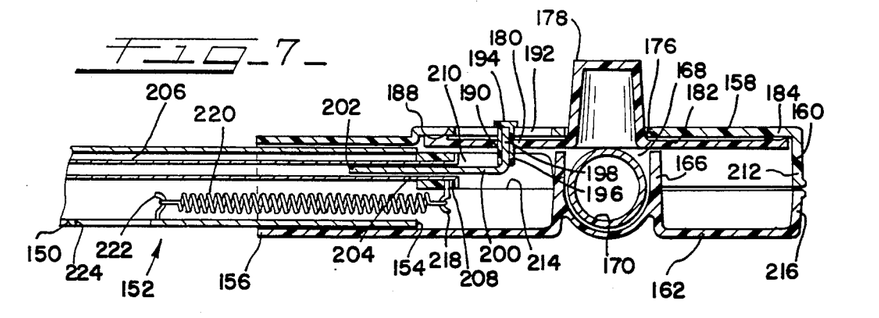
FIG. 7 is a side elevation view in section as seen generally along the line 7—7 in FIG. 6.

Also positioned between the hopper arms 44 and attached thereto by a series of fasteners 146 is a lower end 148 of a tubular extension 150 of a handle assembly 152. An upper end 154 of the extension 150 is secured in an extension socket 156 of a flow control housing 158 of the assembly 152. The housing 158 is defined by upper and lower housing parts 160,162. The housing 158 further includes a pair of aligned handle bar sockets 164 which, like the extension socket 156, is formed respectively by a joinder of socket portions on each housing part 160,162. In the lower housing part 162 is an inner channel 166 which aligns with the handle bar sockets 164. The sockets 164 and channel 166 form an opening 168 through the housing 158 for a handle bar 170. Outer ends 172 of the handle bar 170 are positioned respectively on each side of the housing 158 and inhibited from movement by fasteners 174.

In a top wall 184 of the upper housing part 160 is a centrally located aperture 176. Projecting upward through this aperture 176 is a knob 178 of a control dial 180. The dial 180 has a circular plate portion 182 positioned between the top wall 184 of the housing upper part 160 and the housing lower part channel 166. The dial plate portion 182 includes a display of flow numbers 186, for example digits "0–10," located about a peripheral plate portion 182 to align with a display window 188 in the housing upper part top wall 184. Additionally, the dial plate portion 182 is formed with helically shaped slot 190 which intersects with a longitudinal groove 192 in the housing upper part top wall 184.

Positioned in the top wall groove 192 and dial slot 190 is a post 194 having a downward extending hollow body 196. A first leg 198 of an L-shaped pin 200 is disposed in the post hollow body 196 with a second leg 202 of the pin 200 located under the dial plate portion 182. This second leg 202 is slidably assembled inside a top end 204 of a hollow control rod 206. The pin 200 is preferably made of a metal such as aluminum. The control rod top end 204, in turn, is afixed to a control bar 208. This control bar 208 is slidably positioned in spaced openings 210 in an outer wall 212 of the housing upper part 160 on each side of the extension socket 156. The control dial plate portion 182 and a top edge 214 of an outer wall 216 of the housing lower part 162 serve as guides for the control bar 208. At each end of the control bar 208 is a radiused finger gripping recess 217.

Attached to the control bar 208 immediately below the control rod 206 is a hook 218 to secure one end of a coil spring 220. An opposite end of the spring 220 is attached to a further hook 222 secured inside the handle assembly extension 150. An opening 224 adjacent to the hook 222 allows this hook-extension assembly. The distance between the hooks 218,222 and the length of the spring 220 is such that the spring 220 is expanded to produce a downward force on the control bar 208 and attached control rod 206.

Figure 11:
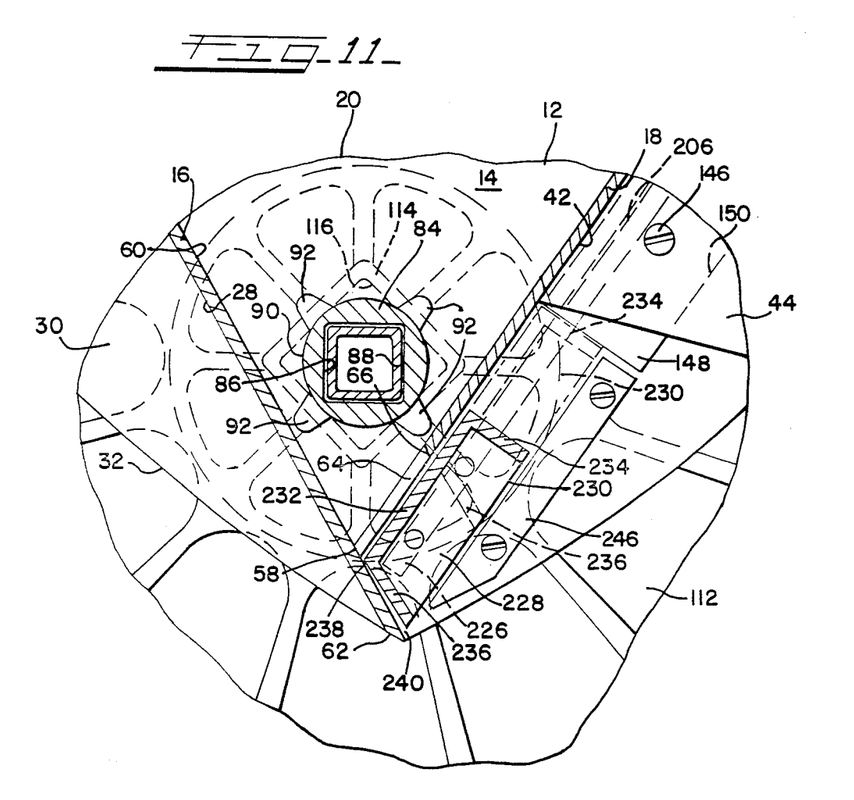
FIG. 11 is a detailed view of the gate assembly.

As seen in FIGS. 3 and 4, a bottom end 226 of the control rod 206 extends beyond the lower end 148 of the handle assembly extension 150 to be secured in a centrally located bracket 228 of a gate 230. The gate 230 has a channel shaped cross section defined by a front member 232 which connects with a top and a bottom flange 234,236. The bottom flange 236 is set at an obtuse angle with respect to the front member 232. As seen in FIG. 4, this positioning of the gate bottom flange 236 limits contact between the gate 230 and the hopper front wall inner side 60 to a front bottom edge 238 of the gate 230 as the hopper front wall 16 and gate bottom flange 236 are not aligned. This misalignment forms a relief space 240 below this edge 238 between the gate bottom flange 236 and the hopper front wall 16. The gate 230 further includes end pieces 242 and a pair of spaced apart reinforcing gussets 244 (see FIG. 3) positioned between the gate top and bottom flanges 234,236. Guide plates 246 attached one each to the hopper sidewall rear outer portions 24 maintain the gate front member 232 in close proximity to the hopper rear wall outer side 42.

When the spreader 10 is to be placed in service, the hopper 12 is filled with a lawn care product such as a dry granular fertilizer. During filling of the hopper 12 the kickstand 134 may be placed in its down position to hold the spreader 10 upright as seen in FIGS. 1 and 2. Gravity and the downward force of the spring 220 maintain the gate 230 in its normally closed position, as seen in FIG. 4 wherein the gate 230 is shown in solid lines. In this closed position the gate front member 232 covers the hopper slots 64 and the gate bottom edge 238 seats against the hopper front wall inner side 60 to form a seal therewith. Leakage about the gate end pieces 242 is inhibited by the guide plates 246.

Assuming that the hopper 12 of the spreader 10 is full, the spreader 10 may be moved to an area of lawn to be fertilized. The operator then sets the rate at which the fertilizer is to be dispersed by gripping the control dial knob 178 and rotating the dial 180 to place a particular control number 186 in alignment with the flow control housing display window 188. This setting typically is obtained from instructional information on the fertilizer container.

Rotation of the dial 180 interacts the dial slot 190 with the stop post 194 to move the location of the stop post 194 in the control housing groove 192. Stop post movement in the control housing groove 192 increases or decreases the distance between the post 194 and the control bar 208. This post movement also produces a like movement of the long leg 202 of the pin 200 inside the control rod top end 204. Use of corrosion resistant material for the pin 200 insures that the sliding action between the pin leg 202 and rod top end 204 remains operative. Additionally, the connection between the stop post 194 and pin leg 198 insures that the stop post 194 remains in an upright position in the dial slot 190 and housing groove 192. This positioning of the stop post 194 promotes reliable dial rotation regardless of the location of the control bar 208. This positive positioning of the stop post 194 also inhibits inadvertent dial movement. Note that at all times operation of the control dial 180 is independent of the operation of the control bar 208 and attached control rod 206.

With the kickstand 134 up the operator now may push the spreader 10 forward while at the same time compressing the control bar 208 until the bar 208 engages the stop post 194. Control bar movement expands the spring 220 and produces a direct, like movement of the control rod 206 and the gate 230 to uncover the hopper slots 64, as seen in FIG. 4 wherein the gate 230 is set forth in broken lines. The distance that the control bar 208 moves until the bar 208 engages the stop post 194 is equal to the distance that the hopper slots 64 are uncovered by the gate 230. The amount of fertilizer discharged over a particular area is directly proportional to this distance.

During movement of the spreader 10 the free wheel 110 merely rolls over the ground below allowing a ready change in spreader direction. The drive wheel 112 through the coupling 102 rotates the shaft 88 and agitator bar 84 to interact the bar projections 92 with adjacent material. This projection-material interaction promotes a uniform flow of material through the hopper slots 64 and onto the ground below. The position of the hopper slots 64 allows the operator to monitor this flow.

As the wheels 110,112 roll forward, the wheel lugs 130 penetrate the turf below to produce improved traction as well as an agitating bounce. This further agitation of the hopper 12 promotes material flow in and through the hopper 12. Additionally, the wheel lugs 130 produce a mark in the turf defining the path of the spreader 10. This mark indicates that portion of the lawn that has been fertilized. The operator then may accurately position the spreader 10 with respect to this mark on the next pass to prevent excessive overlapping or missing an area between passes. The wheel lug configuration noted above has proved particularly useful in producing increased agitation, adequate traction and well defined marking.

To reduce finger and arm fatigue of the operator which may result over time from compressing the control bar 208 while gripping the handle bar ends 172, the elevation of the handle bar 170 may be adjusted to fit the particular physique of the operator in relation to the slope of the terrain over which the spreader 10 is being pushed. Finger fatigue also is reduced by minimizing the amount of force required to hold the control bar 208 against the stop post 194. This result is effected by the light weight of the gate-rod-control bar assembly. Additionally, as expanded, the spring 220 with gravity provides just enough force to return the gate 230 to its normally closed position. Because this returning movement is direct and nearly friction free, the force exerted by the spring 220 on the assembly may be minimal.

Assuming that operation of the spreader 10 is stopped before the hopper 12 is empty, the operator merely releases the control bar 208 to stop a further discharge of material. The spring 220 and gravity return the gate 230 to its normally closed position. In this case, material that has passed through the hopper slots 64 does not interfer with sealing of the gate edge 238. The relief space 240 prevents any such material from becoming trapped between the hopper front wall 16 and the gate bottom flange 236. Material so trapped could prohibit this sealing.

To prepare the spreader 10 for storage, first any unused material in the hopper 12 may be returned to the material container. Any residue of this material then may be washed from the hopper 12 with a garden hose to prevent contamination of the next applied lawn product, for example, a grass seed. Active chemical matter in the fertilizer, which may form a corrosive solution when mixed with water, has little effect on components of the spreader 10 since most are made of corrosion resistant plastic. Note that there are no seams in the one-piece hopper 12 to entrap any of this solution. Even the shaft 88, which is metal, is protected from contact with the solution by the agitator bar 84 and the couplings 98,102 fitted over the shaft ends 94,96. Also note that there is no metal-to-metal contact between the ends 82 of the agitator bar 84 and the bushings 72 since both are plastic. These rotational connections remain corrosion free.

When the spreader 10 is ready to be stored, the kickstand 134 may be returned to the down position. Alternately, the spreader 10 may be hung by its handle bar 170 from wall brackets. In this case the kickstand upright 136 may be rotated beyond its up position to align with the handle assembly extension 150 allowing the spreader 10 to fit tightly against the supporting wall.

While an embodiment of this invention has been shown and described, it should be understood that this invention is not limited thereto except by the scope of the claims. Various modifications and changes can be made without departing from the scope and spirit of the invention as the same will be understood by those skilled in the art.

What I claim is:

1. A spreader for lawn care related materials, said spreader comprising:

hopper means to hold a supply of said material, wheels means rotatively attached to said hopper means to allow movement of said spreader over terrain supporting said spreader and movement to an agitator bar in said hopper means to promote a uniform flow of said material through discharge openings in said hopper means, gate means carried by said hopper means adjacent to said hopper means discharge openings, said gate means slidable between a first open position to uncover said openings and allow said flow of said material therethrough and a second close position with a front member of said gate means covering said openings, an edge of said gate means seating against a front wall of said hopper means, and a bottom flange of said gate means offset from said front wall to form a relief space therebetween to promote sealing of said gate means edge, handle assembly means for manual operation of said spreader, said handle assembly means including an extension having one end attached to said hopper means and an opposite end to a flow control housing, a handle bar carried by said housing with ends of said handle bar extending outward from said housing, a movable control bar operatively connected to said gate means for direct movement of a said gate means between said open and close positions, a control dial carried by said housing for positioning a stop slidably connected to said housing with said stop interacting with said control bar to selectively regulate said gate means open position, and a spring attached to said extension and said control bar to generate a closing force on said gate means, and stand means attached to said hopper means with said stand means having a down position to maintain said spreader upright and an up position allowing elevation adjustment of said handle assembly means handle bar during spreader operation.

2. A spreader particularly adapted for applying lawn care material, said spreader comprising:

a one-piece hopper made of corrosion resistant material and having a rear wall prepared with spaced apart slots for release of said material, a shaft disposed in an agitator bar rotatively carried by sidewalls of said hopper with ends of said shaft extending beyond said sidewalls, a free fitting coupling positioned on one said shaft end to join with a free wheel of said spreader, an interference fitting coupling positioned on said other shaft end to join with a drive wheel of said spreader, a movable gate located on an outer side of said rear wall of said hopper, said gate having a front member positioned next to said hopper slots to selectively uncover or cover said slots and an edge to seal against a front wall hopper to further inhibit said material flowing through said slots with said gate in said covering position, and a handle assembly including an extension having a lower end attached to arms on said hopper rear wall and an upper end attached to a flow control housing, a handle bar disposed in an opening through said housing, a control bar slidably carried in spaced openings in an outer wall of said housing with said control bar connected directly to said gate by a control rod inside said extension, a spring carried by said extension and attached to said control bar to provide a force to place said gate in said slot covering position, and a stop post carried in a groove in said housing and operatively connected to a dial in said housing to adjust a position of said stop post and limit movement of said gate from said covering position by said control bar, wherein during periods of nonuse of said spreader said gate is maintained by said spring in said slot covering position to inhibit material flowing through said hopper slots and during periods of use of said spreader said control bar may be drawn toward said handle bar to move said gate directly to said slot uncovering position and allow said material to flow therefrom, said control bar movement limited by said stop post with said stop post position being conveniently adjustable during spreader operation by mere rotation of said dial.

3. In a lawn care material spreader having a hopper for holding a supply of said material, wheels operatively connected to said hopper for spreader movement and rotation of an agitator bar located in said hopper to promote a flow of said material through spaced slots in a rear wall of said hopper, a gate positioned on an outer side of said hopper slots and slidably carried in part by guide plates attached to sidewalls of said hopper, and a handle assembly having an extension with a lower end attached to said hopper and an upper end joined to a flow control housing with said housing including means to effect and regulate gate movement to control said flow of said material through said hopper slots, an improvement therein comprising:

said gate having a channel-like shape defined by a front member joined by a top and a bottom flange with said bottom flange positioned at an offset from a front wall of said hopper to form a relief space between said gate bottom flange and said hopper front wall upon a bottom edge of said gate seating on said hopper front wall, a control bar slidably disposed in said flow control housing and connected to said gate by a hollow control rod carried in said handle assembly extension with a path of said sliding movement of said control bar and said gate being directly and continuously aligned and substantially friction free, a dial having a knob centrally located in a plate portion with said plate portion having control numbers displayed about a periphery thereof and a helically shaped slot positioned between said knob and said numbers, said dial rotatively carried in said control housing with said knob projecting upward through an aperture in a top wall of said housing and one of said numbers aligning with a display window in said top wall, a post having a hollow body, said post positioned in a groove in said control housing top wall and in said dial slot, a pin with an L-like shape having a short leg disposed in said post hollow body and a long leg positioned below said dial plate portion and disposed in a top end of said control rod to maintain alignment between said rod and said post, and a spring attached to said control bar and said extension immediately below said control rod, said spring having an effective length to apply a slight downward force on said gate to promote said gate bottom edge seating against said hopper front wall with said force increasing as said control bar moves to engage said post, wherein said spring may maintain said gate in a normally close position to inhibit said flow of said material from said spreader with said flow commencing upon movement of said control bar and increasing in rate until said control bar engages said post, said post positioned by said pin to allow intentional dial rotation and inhibit inadvertent dial rotation.

4. A spreader as defined by claim 3 and further characterized by said hopper formed as one piece of corrosion resistant thermoplastic, said hopper including, an inner space defined by said sidewalls and said front and rear wall converging downward to join a bottom edge of said rear wall with said front wall at a point above a bottom edge of said front wall, a top reinforcing flange defined by portions formed as part of said front wall, rear wall and sidewalls respectively, said front wall flange portion positioned parallel to said rear wall and said rear wall flange portion positioned parallel to said front wall, a pair of spaced apart arms integrally formed as part of said rear wall and extending outward therefrom to hold a kickstand and said handle assembly extension lower end, each of said arms having a bracket portion with a boss formed on an inner surface of such to engage and maintain said stand in an up position or a down position, said hopper rear wall slots having upper radiused ends positioned parallel to hopper front wall, and a pair of ribs attached to said hopper rear wall and respectively between one said arms and adjacent sidewall with said ribs positioned parallel to said front wall, wherein said positioning of said front and rear wall, said front and rear wall flange portions, said rear wall slot radiused ends and said rear wall ribs allows a female and a male die portion of a die for forming said hopper to remain aligned as said die portions are drawn apart to release said hopper as formed.

5. A spreader as defined by claim 3 and further characterized by, said wheels of said spreader having an outer peripheral surface with lug means to provide improved traction with turf on which said spreader may operate, a bounce to further agitate said material in said hopper, and a mark in said turf defining a path of movement of said spreader.

6. A spreader as defined by claim 5 and further characterized by, said wheel lug means being at least 24 teeth on said wheel peripheral surface which project outward about ⅛ inch.

7. A spreader as defined by claim 3 and further characterized by, said agitator bar having an inner opening and ends rotatively carried in bushings attached one each to said hopper sidewalls with each connection between said agitator end and said bushing being corrosion resistant, a shaft disposed in said agitator bar inner opening with ends of said shaft extending beyond said bushings, a free coupling carried on one said shaft end and having a cylindrical outer surface, an interference coupling carried on said other shaft end and having sides defined in part corner segments spaced apart by a recess, and said spreader wheels comprising a free wheel and a drive wheel with each said wheel formed with a central hub having an opening extending between sides of said wheels, said free coupling positioned in said free wheel hub opening to form a free rotational fit therewith and said interference coupling positioned in said drive wheel hub opening to form an interference fit therewith, wherein during operation of said spreader said free wheel allows a ready change of direction of said spreader while said drive wheel rolls to produce rotation of said agitator bar in said hopper to promote said flow of said material through said hopper slots.

8. A spreader as defined by claim 3 and further characterized by said flow control housing including, an upper housing part defined in part by said housing top wall connecting with an outer wall, spaced openings formed in said outer wall on each side of a socket for said extension upper end with said control bar carried in said openings, and a lower housing part defined in part by an outer wall having a top edge joined to said upper part outer wall with said lower part outer wall edge forming a guide for movement of said control bar in said upper part outer wall openings, and a channel extending across said lower part to define in part an opening in said flow control housing for a handle bar having ends extending beyond said housing with said dial plate portion carried by said channel to maintain said dial knob in said upper part top wall aperture.

* * * * *